Figure 1:
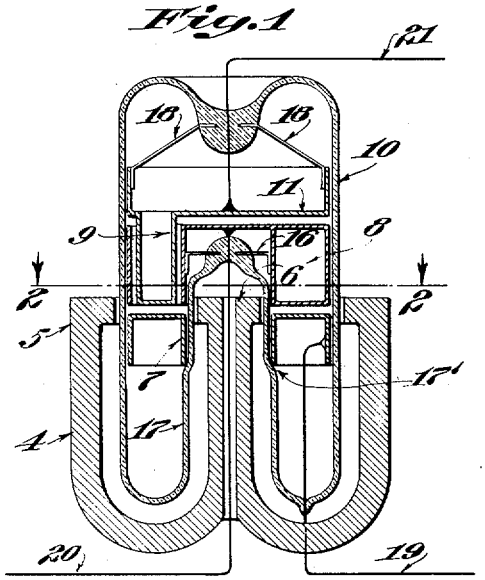

C. G. SMITH

ELECTRICAL APPARATUS

March 1, 1932. Re. 18,368

Original Filed July 30, 1923

Inventor

Charles G. Smith by his Attorneys

Van Everen & Schmidt & Perry

Witness:

M. G. Crozier

Reissued Mar. 1, 1932 Re. 18,368

UNITED STATES PATENT OFFICE

CHARLES G. SMITH, OF MEDFORD, MASSACHUSETTS, ASSIGNOR, BY MESNE ASSIGNMENTS, TO RAYTHEON, INC., OF CAMBRIDGE, MASSACHUSETTS, A CORPORATION OF MASSACHUSETTS

ELECTRICAL APPARATUS

Original No. 1,714,404, dated May 21, 1929, Serial No. 654,643, filed July 30, 1923. Application for reissue filed May 21, 1931. Serial No. 539,121.

The present invention relates to electrical apparatus and more particularly to the type of electrical apparatus involving electrical conduction through a gaseous medium.

The usual types of gaseous conduction apparatus employ a gaseous region having electrodes immersed therein, together with provision for impressing a sufficient potential difference between the electrodes to cause ionization and consequent conduction in the gaseous region. Such prior constructions as have been placed upon the market ordinarily admit of simple electrical conduction between the electrodes and in some cases possess the property of rectifying alternating currents but in none of them, as far as I am aware, is it possible to obtain control of the gaseous conduction as is desirable for the amplification, modulation or production of electrical oscillations.

The principal object of this invention is to provide gaseous conduction apparatus having provision for readily altering and controlling the electrical conducting properties therein.

With this and other objects in view, I have discovered that the conducting properties of an electrically stressed gaseous region are materially dependent upon the continuity of the ionization throughout the region and that by a suitable distortion of the ionization in a portion of the region, the conducting properties of the region, as a whole, may be altered. Accordingly, one feature of the present invention contemplates the provision of a gaseous region which is caused to be electrically conducting upon the application of an electric field, together with means for distorting the ionization over a small portion of the gaseous region to alter the conductivity of the conducting gas as a whole.

The operation of such a device may be briefly explained as follows: Electrical conduction in any gaseous medium is caused by the ionization of gas molecules by the impact of electrons against the molecules. Electrons impelled by the electric field collide with gas molecules, thus forming positive ions which in turn are also impelled by the electric field and are in themselves able to ionize other gas molecules by collision. It will be seen that the conducting condition of the gaseous conduction device arises principally from the progressive and cumulative ionizing action of the electrons and ions in the gas and that any attempts to arrest or distort this cumulative action, even over only a small portion of the gaseous region, will seriously affect the conducting properties of the entire region between the electrodes. It is believed therefore that the present invention in which the ionization is distorted over a small portion of the gaseous region depends for its operation upon the principle of arresting the cumulative ionizing action in the gas.

Other features of the invention consist of certain novel features of construction, combinations and arrangement of parts hereinafter described and claimed, the advantages of which will be obvious to those skilled in the art from the following description.

Figure 2:
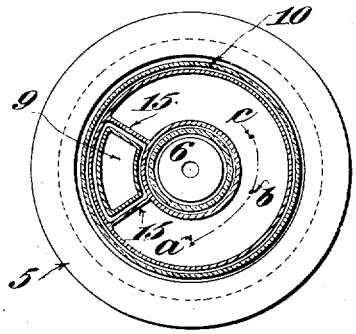
Figure 3:
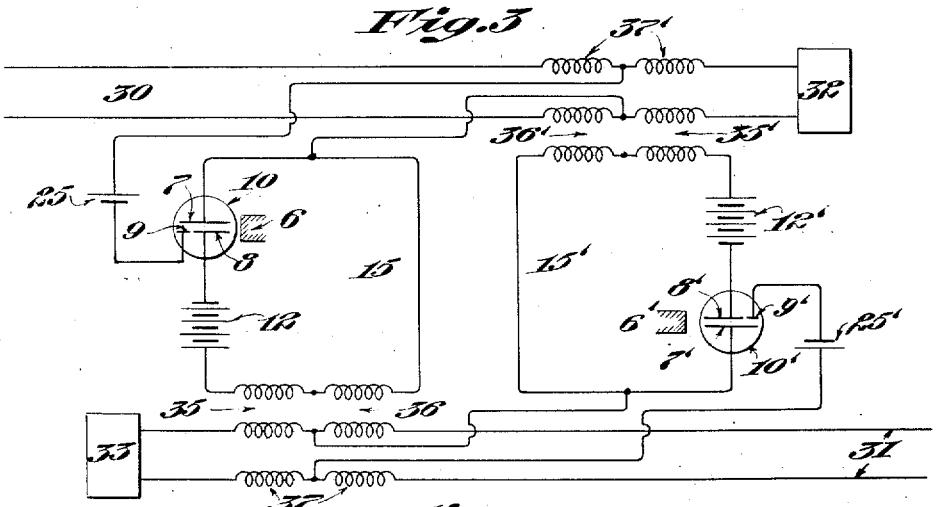
Figure 4:
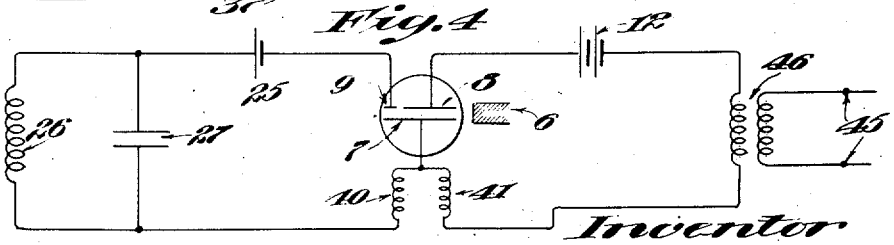

In the accompanying drawings Figure 1 is a sectional elevation of an apparatus embodying the features of this invention; Fig. 2 is a section on line 2—2 of Fig. 1; Fig. 3 is a diagram of a type of telephone repeater circuit embodying one or more of the devices shown in Fig. 1; and Fig. 4 is a diagram of a simple circuit for the generation of electrical oscillations also embodying one of the devices of the present invention.

The features of this invention are conveniently embodied in the type of apparatus disclosed in my Patent 1,545,207 granted July 7, 1925. The above patent describes a novel type of insulating device comprising a pair of electrodes spaced sufficiently close together in a gaseous medium to normally limit the excursions of the electrons in the gas to distances which are so short that gaseous ionization is prevented. For the purposes of the present invention the gaseous medium is caused to become conducting through the action of forces which tend to deflect the electrons in a sidewise direction between the electrodes in order to lengthen their paths sufficiently to allow of collisions between the electrons and molecules of the gas. This is preferably effected by the employment of a magnetic field impressed in the gaseous region between the electrode surfaces. The use of such a magnetic field for deflecting the electrons and lengthening their paths is fully described and explained in my Patent 1,617,171 granted February 8, 1927. The illustrated embodiment of the present invention provides for the distortion of the ionization over a small portion of the gaseous region by means of an auxiliary electrode which may be inserted in a space removed from one of the main electrodes. The specific form of the invention to be presently described in detail employs electrodes having plane opposing surfaces but the principles of the invention may be obviously extended to include electrodes of any shape whatever.

Referring to the drawings, the invention in its preferred form consists of a receptacle 10, preferably of glass, containing a rarefied gas such as pure helium. Within the receptacle are located two main electrodes 7 and 8 having opposing plane surfaces located such a short distance apart that gaseous ionization is normally impossible. The proper distance between the electrodes is comparable to the mean free path of electrons in the gas, that is a distance such that electrons traveling directly across the gas space between the electrodes produce insufficient ionization to initiate substantial conduction, the mean free path of the electrodes being understood to be the average distance traversed by the electrons without ionizing impact with gas molecules (or atoms). As shown in Fig. 1, the electrodes are made annular in form and are adapted to be supported upon a reentrant stem 17 of the receptacle 10. Electrode 7 is conveniently supported upon a constriction 17′ of the stem and electrode 8 is supported by means of metallic straps 16 attached to the electrode and sealed into the top of the stem. The electrodes are so set up in the receptacle that the sides of the electrodes are spaced from the walls of the receptacle a distance which is of the order of magnitude of the distance separating the electrodes themselves, thus preventing ionization between the electrodes and the walls of the receptacle. The auxiliary electrode for the purpose of distorting the ionization consists of a supporting portion 11 and a depending portion 9. The supporting portion 11, which is conveniently attached to the receptacle by means of metallic straps 18, has its exposed surfaces spaced so close to the surface of electrode 8 and to the walls of the receptacle that ionization is also precluded at those points. The depending portion 9 fits into a portion cut away from electrode 8, the plane surfaces of electrodes 8 and 9 being flush. As shown in Fig. 2, electrode 8 is provided with upstanding walls 15 completely surrounding electrode 9 and spaced sufficiently close thereto so that ionization in the region between electrodes 8 and 9 is impossible. It will be seen that according to the principles outlined in my Patent 1,545,207, referred to above, that ionization in any portion of the gaseous region is normally impossible since all portions of the gaseous region capable of being ionized are confined to small dimensions by the electrode surfaces. Conduction between the plane opposing surfaces of the electrodes is then caused by means of a magnet 4 having an internal pole 6 and an external annular pole 5 adapted to set up a radial magnetic field in the region separated by the plane surfaces of the electrodes. For the purpose of connecting with external circuits, suitable lead wires 19, 20 and 21 cooperating with electrodes 7, 8 and 9, respectively, are sealed into the receptacle. The lead wire 20 is conveniently passed through a hole in the pole 6 of the magnet. The action of ionization in this type of apparatus may be more readily understood by tracing what is believed to be the possible path of an electron in the gas.

Under the action of an electrical potential difference existing between electrodes 7 and 8, any free electrons in the gas are initially impelled in a direction practically normal to the electrode surfaces, but under the cooperating action of the magnetic field, the electrons are deflected so as to have a component of velocity parallel to the electrode surfaces. The electron paths are thus sufficiently lengthened so that the number of collisions between the electrons and gas molecules are greatly increased. On the plan view of the electrodes as shown in Fig. 2, for example, an electron starting at *a* follows approximately the path indicated by the dotted line and finally collides with a gas molecule at *b* forming a positive ion. The positive ion is impelled by the electric field against the cathode and due to its relatively large mass and low velocity, it is not sensibly deflected by the magnetic field. The impact of the ion against the cathode tends to liberate more electrons. It is not at present certain whether such an impact liberates one or more electrons or whether a number of such collisions are necessary to liberate even one electron, but for the purpose of explanation it will be assumed that each impact of a positive ion against the cathode liberates one electron. A liberated electron leaving from the point directly under *b* is also deflected by the magnetic field, following the dotted line from *b* toward *c* where it collides with another gas molecule. The original electron is also present and is enabled to ionize other gas molecules of its own accord. It will be seen that the ionizing action takes place progressively and cumulatively around the electrodes and it is quite apparent that any interruption of the progressive action may seriously reduce the conducting properties of the gaseous region as a whole. If the electrode 9 is maintained at the potential of electrode 8, there is no such interruption of the progressive ionization and the device as a whole possesses conducting properties, but if the electrode 9 is disconnected or maintained at a potential approaching that of electrode 7, the progressive action is interrupted and the ionization directly under electrode 9 is distorted. As a result, the conducting properties of the entire device are materially weakened. The chief utility of the apparatus, however, lies in the fact that if electrode 9 undergoes variations of potential intermediate to the potentials of electrodes 7 and 8, the conductivity of the gaseous region between electrodes 7 and 8 is caused to vary in step with the potential of electrode 9. The device thus possesses the property of relay action and may be used in circuits for the amplification, generation, modulation or rectification of alternating currents.

When used as a device for operating upon electrical oscillations the two main electrodes of this apparatus are connected with a source of energy into an output circuit and the auxiliary electrode, together with one of the main electrodes, is connected into a circuit upon which the desired oscillations are impressed. The telephone repeater system shown in Fig. 3 is the usual type of two-way, two-element commonly known as the 22 type of system. It comprises two amplifying circuits, one for the amplification of currents traveling in one direction and the other for the amplification of currents traveling in the other direction. In each of these circuits is embodied an amplifying or repeating device. In Fig. 3, 30 and 31 represent, respectively, the telephone lines leading into the repeater system. For the amplification of currents passing from line 30 to line 31, an amplifying system having an output circuit 15 is provided. This output circuit contains a source of direct current energy 12 and the main electrodes 7 and 8 of the device 10, previously described. The input circuit of the device is connected into line 30 in such a manner that the variations in potential in line 30 may be caused to vary the potential of electrode 9 with respect to that of 7 and 8. To this end, the input circuit is connected to electrodes 7 and 9. As previously stated, it may be desirable to keep electrode 9 at an average potential intermediate to the potentials of electrodes 7 and 8 and for this purpose a battery 25 is provided. The magnetic means for lengthening the electron paths is designated generally at 6. An exactly similar system comprising an output circuit 15′, amplifying tube 10′ and a battery 12′, is connected into the line 31. The output circuit 15 contains the primary coils of transformers 35 and 36, the secondaries of which are included in one of the wires of line 31. The other wire of line 31 contains inductance coils 37 similar to the transformer secondaries. Similar transformers and inductance coils 35′, 36′ and 37′ cooperate with line 30. Lines 30 and 31 lead respectively into networks 32 and 33 which are artificial lines having as nearly as possible the same electrical characteristics as the lines 30 and 31 themselves. The input circuit from line 30 leading into electrodes 7 and 9 of the amplifier 10 is connected into line 30 at the junction points of inductances 35′ and 36′ and between the coils 37′, as shown. The input circuit to amplifier 10′ is connected in line 31 in an exactly similar manner. The operation of this system may be explained as follows: Electrical oscillations traveling to the right over line 30 divide a portion of their energy between network 32 and the output circuit of amplifier 10. That portion of the energy which passes into network 32 is lost and that portion which passes into the input circuit of the amplifier is multiplied and passed into line 31 through transformers 35 and 36. Of this amplified energy, one half passes to the right by line 31 and travels to its destination and the other half is absorbed by the network 33. If line 31 and network 33 are perfectly balanced, it will be seen that no difference of potential can exist across the input circuit of amplifier 10′ because of the balancing effect or Wheatstone bridge action of the transformer coils and inductances 35, 36 and 37. If line 31 and network 33 are not perfectly balanced, a difference of potential will exist across electrodes 7′ and 9′ and this difference of potential will cause an amplified current to flow in output circuit 15′. This amplified current will be transmitted into line 30 and if line 30 and network 32 are not perfectly balanced, another difference of potential will exist in the input circuit of tube 10. This constitutes a feed back action and if the total unbalance is sufficient, undesirable oscillations will take place. It is therefore necessary that the networks be fairly well balanced with their respective lines. In the same manner energy traveling to the left over line 31 is amplified through tube 10′ and circuit 15′ and passed into line 30.

The oscillating system shown in Fig. 4 depends upon the well known feed-back principle, that is, the transfer of energy from the output back to the input circuit by means of some sort of coupling. As before, the output circuit contains a battery 12 and is connected to electrodes 7 and 8 of the gaseous conduction device 10. Magnetic means indicated at 6 is employed for lengthening the electron paths to cause ionization to take place. The input circuit is connected between electrodes 7 and 9 and may contain an auxiliary source of energy 25. The two circuits may be coupled in any of the usual forms, that is, by electromagnetic, electrostatic or resistance couplings. The coupling is here shown as carried out by means of cooperating inductance coils 40 and 41 connected respectively in the input and output circuits. The frequency of the produced oscillations is determined by tuning one of the circuits, as is indicated in the present case, by inserting an inductance 26 and condenser 27 in the input circuit. The oscillations may be utilized in a third circuit 45 connected to the output circuit by a transformer 46.

While it is preferred to employ the specific construction and arrangement of parts shown and described, it will be understood that this construction and arrangement is not essential except so far as specified in the claims and may be changed or modified without departing from the broader features of the invention.

The invention having been described, what is claimed is:

1. A method of controlling the conducting properties of a gaseous medium between two electrodes spaced sufficiently close together to normally prevent gaseous ionization which consists in lengthening the paths of electrons between the electrodes to cause conduction to take place, and distorting the ionization over a small portion of the electrode surfaces.

2. An electrical apparatus comprising a gas-filled receptacle having electrodes so arranged that all electron paths through the gas are normally too short to initiate gaseous conduction, means for lengthening the electron paths to cause gaseous conduction to take place, and means for distorting the ionization over a portion of the gaseous region.

3. An electrical apparatus comprising two electrodes in a gas, the distance between the electrodes being comparable to the mean free path of the electrons in the gas, means for lengthening the electron paths in a manner to cause progressive ionization around the electrode surfaces, and means for partially arresting the progressive action in a portion of the gaseous region.

4. A method of controlling the conducting properties of a gaseous medium between two electrodes which consists in causing electrons in a gas to take paths having a component of direction parallel to the electrode surfaces in a manner to cause progressive ionization to take place, and causing the progressive action to be partially nullified over a small portion of the electrode surfaces.

5. An electrical apparatus comprising two electrodes immersed in a gas, the distance between the electrode surfaces being comparable to the mean free path of electrons in the gas, means for impressing a magnetic field to lengthen the electron paths and cause ionization of the gas, and means for distorting the ionization in a portion of the gaseous region separating the electrodes.

6. An electrical apparatus comprising two electrodes immersed in a gas, the distance between the electrode surfaces being comparable to the mean free path of electrons in the gas, means for lengthening the electron paths to cause gaseous ionization, and an auxiliary electrode introduced into a portion of the gaseous region for the purpose of distorting the ionization in the portion of the region adjacent the anxiliary electrode.

7. An electrical apparatus comprising two electrodes in a gas, the distance between the electrodes being so short that gaseous conduction is normally impossible, means for impressing a magnetic field of sufficient strength to cause ionization of the gas, and an auxiliary electrode introduced into the gaseous region for the purpose of distorting the ionization in a manner to alter the conducting properties of the entire gaseous region.

8. An electrical apparatus comprising two electrodes immersed in a gas, the electrodes being so arranged relatively to one another that all electron paths in the gas are too short to allow of gaseous ionization, means for lengthening the electron paths in a direction substantially parallel to the electrode surfaces to cause progressive ionization, and means for partially arresting the progressive action at a point within the gaseous region.

9. Means for operating upon electrical oscillations comprising a gaseous medium having one dimension comparable to the mean free path of electrons in the gas, means for cumulatively and progressively ionizing the gas, and an input circuit cooperating with the gaseous medium and adapted to partially arrest the progressive ionizing action in the gas in a manner to vary the conductivity of the gas in accordance with oscillations impressed upon the input circuit.

10. A system for amplifying electrical oscillations comprising an output circuit and an input circuit, a pair of electrodes connected in the output circuit and immersed in a gaseous medium a distance apart comparable to the mean free path of electrons in the gas, a source of energy in the output circuit, means for causing cumulative and progressive ionization around the electrodes, and a third electrode connected in the input circuit and adapted to partially arrest the progressive ionizing action in the gas in a manner to vary the electrical characteristics of the output circuit in accordance with oscillations impressed upon the input circuit.

11. A gaseous conduction device comprising a sealed vessel containing an ionizable gas at low pressure, and a pair of main electrodes having extended electrode surfaces disposed apart from each other within a distance of the order of the mean free path of electrons in the gas, means for producing conduction of electricity through the body of gas in the space between said electrodes, and an auxiliary electrode located adjacent one of said main electrodes within a distance of the order of the mean free path of electrons in the gas and arranged to control the conduction in the space between said main electrodes by variation of potential applied to said auxiliary electrode.

12. A gaseous discharge device comprising a sealed vessel containing an ionizable gas at low pressure, and a pair of main electrodes having extended electrode surfaces disposed apart within a distance too short to permit gaseous ionization by the potential applied therebetween, said electrodes being so arranged in said vessel as to block the paths therebetween that are sufficiently long to produce ionization at the applied potential, means for effecting conduction of electricity through the body of gas in the space between said main electrodes, and an auxiliary electrode located adjacent one of said main electrodes within a distance too short to permit ionization of the gas by the potential applied therebetween, said auxiliary electrode being arranged to control the conduction of the space between said main electrodes by variation of the potential applied thereto.

13. A gaseous discharge device comprising a sealed vessel containing an ionizable gas at low pressure, a first electrode having an extended electrode surface, a second electrode having an extended electrode surface disposed away from the electrode surface of said first electrode within a distance too short to permit gaseous ionization by the potential applied therebetween, a source of current serially connected between said first electrode and said second electrode, said electrodes being so arranged within said vessel as to block ionization of the gas along paths between said electrodes that are sufficiently long to produce ionization under the potential applied to said electrodes in operation, means for effecting conduction of electricity from said source through the body of gas between the electrode surfaces of said electrodes, and an additional electrode located adjacent said first electrode within a distance too short to permit ionization of the gas under the applied voltage, said additional electrode being arranged to vary the conduction in the space between said first electrode and said second electrode by the variation of potential applied between said first electrode and said additional electrode.

14. A gaseous discharge device comprising a sealed vessel containing an ionizable gas at low pressure, a first electrode having an extended electrode surface, a second electrode having an extended electrode surface disposed away from the electrode surface of said first electrode within a distance too short to permit gaseous ionization by a potential applied therebetween, a source of current serially connected between said first electrode and said second electrode, said electrodes being so arranged within said vessel as to block ionization of the gas along paths between said electrodes that are sufficiently long to produce ionization under the potential applied to said electrodes in operation, means for producing a magnetic field effecting conduction of electricity from said source through the body of gas between the electrode surfaces of said electrodes, and an additional electrode located adjacent said first electrode within a distance too short to permit ionization of the gas under applied voltage, said additional electrode being arranged to vary the conduction in the space between said first electrode and said second electrode by the variation of potential applied between said first electrode and said additional electrode.

15. A gaseous conduction device comprising a sealed vessel containing an ionizable gas at low pressure, and a pair of main electrodes having extended electrode surfaces disposed apart from each other within a distance of the order of the mean free path of electrons in the gas, means for producing conduction of electricity through the body of gas in the space between said electrodes, an auxiliary electrode located adjacent one of said main electrodes within a distance of the order of the mean free path of electrons in the gas and arranged to control the conduction in the space between said main electrodes by variation of potential applied to said auxiliary electrode, and barrier means associated with said electrodes to prevent electrons in the vessel from entering into paths between the electrodes long enough to be broken down by the voltages applied to the electrodes.

In testimony whereof, I have hereunto subscribed my name this 19th day of May, 1931.

CHARLES G. SMITH.